United States Patent [19]

Carey, II

[11] Patent Number: 5,354,624
[45] Date of Patent: * Oct. 11, 1994

[54] COATED COPPER ROOFING MATERIAL

[75] Inventor: Jay F. Carey, II, Follansbee, W. Va.

[73] Assignee: The Louis Berkman Company, Steubenville, Ohio

[ * ] Notice: The portion of the term of this patent subsequent to Nov. 17, 2010 has been disclaimed.

[21] Appl. No.: 154,375

[22] Filed: Nov. 17, 1993

Related U.S. Application Data

[63] Continuation of Ser. No. 967,407, Oct. 26, 1992, abandoned, which is a continuation-in-part of Ser. No. 913,209, Jul. 15, 1992, abandoned.

[51] Int. Cl.⁵ ............... B32B 15/20; C22C 13/02
[52] U.S. Cl. .................. 428/647; 420/559; 420/561
[58] Field of Search ........... 428/644, 647, 648, 639; 420/558, 559, 560, 561

[56] References Cited

U.S. PATENT DOCUMENTS

| | | | |
|---|---|---|---|
| 84,205 | 11/1868 | Mills | 428/648 |
| 347,928 | 8/1886 | Farmer | 428/648 |
| 2,210,593 | 8/1940 | McCullough | 420/559 |
| 4,321,289 | 3/1982 | Bartsch | 427/287 |
| 4,695,428 | 9/1987 | Ballentine et al. | 420/561 |
| 4,778,733 | 10/1986 | Lubrano et al. | 428/647 |
| 4,806,309 | 2/1989 | Tulman | 420/561 |
| 4,879,096 | 11/1989 | Naton | 420/561 |
| 4,934,120 | 6/1990 | Boyd | 52/521 |
| 4,987,716 | 1/1991 | Boyd | 52/537 |

FOREIGN PATENT DOCUMENTS

| | | | |
|---|---|---|---|
| 2713196 | 10/1978 | Fed. Rep. of Germany | 420/559 |
| 42-18219 | 9/1967 | Japan | 420/558 |
| 546179 | of 1942 | United Kingdom | 420/557 |
| 796128 | 12/1956 | United Kingdom . | |
| 1513002 | 7/1975 | United Kingdom | C23C 1/06 |
| 1588808 | 9/1977 | United Kingdom | C22C 18/00 |
| 2099857 | 5/1982 | United Kingdom | C23C 1/02 |
| 2117414 | 2/1983 | United Kingdom | C23C 1/06 |

OTHER PUBLICATIONS

Standard Specification for Solder Metal, American Society for Testing and Materials, B32-86, 1986, Table 5, pp. 1 and 9.

Soldering Manual, American Welding Society, NY, 1959, pp. 21-23.

R. R. Dean et al., "Tinplate and Tin Coating Technology", Journal of Metals, Aug. 1987, pp. 42-45.

Primary Examiner—John Zimmerman
Attorney, Agent, or Firm—Vickers, Daniels & Young

[57] ABSTRACT

A copper metal roofing system coated with a highly corrosive resistant material is disclosed which can be used to collect potable water. The copper roofing system is highly malleable allowing on site formation of the copper roofing materials into a variety of simple and complex shapes. The highly corrosion resistant coating is a metal alloy consisting of at least 90 weight percent tin and not more than 1.0 weight percent lead.

14 Claims, No Drawings

COATED COPPER ROOFING MATERIAL

This is a continuation of application Ser. No. 967,407, filed Oct. 26, 1992, now abandoned, which is a continuation-in-part application of my pending U.S. patent application, Ser. No. 913,209 filed Jul. 15, 1992, now abandoned, entitled "Hot Dip Low Lead Terne Coated Roofing Material."

This invention relates generally to the art of metal roofing systems that are corrosion resistant in a variety of climates and can be used to collect potable water for human consumption.

This invention is particularly applicable to a metal roofing system made of copper preformed sheets coated on both sides with a corrosion resistant metal coating formulation containing tin and very low levels of lead.

INCORPORATED BY REFERENCE

As background material so that the specification need not specify in detail what is known in the art, Federal Specification No. QQ-T-201F and an article entitled "The Making, Shaping and Treating of Steel", U.S. Steel Corporation, 1957, pp. 655–659, Sci. Lib. Coll No. TN T30 C16, 1957 are incorporated herein by reference and made part hereof. Similarly, assignee's U.S. Pat. Nos. 4,987,716 and 4,934,120 illustrate metal roofing systems of the type to which this invention relates and are incorporated herein by reference.

BACKGROUND OF THE INVENTION

For many years, metal roofing systems, specifically stainless steel and low carbon steel sheet, in various sheet gauge thicknesses, have been used for a variety of roofing applications. Stainless steel and low carbon steel are typically treated with a terne metal alloy to reduce the corrosion rate of the roofing system. When the terne coated steel sheets are assembled into a roof covering, adjacent sheet edges are folded over one another and the seam then formed, typically a standing seam, usually soldered vis-a-vis the terne coating to produce a waterproof joint. Today, the terne coated steel sheets are either preformed or formed at the job site onto roofing pans with bent edges which abut edges of adjacent pans which are then pressed or rolled into a watertight seam. Similarly, caps, cleats, etc. are likewise formed from the terne coated sheet. In addition to providing for soldering of the seams, the terne coating inhibits rusting or oxidation of the metal sheet which would otherwise occur over time.

Terne or terne alloy is a term commonly used to describe an alloy containing about 80% lead and the remainder tin. The terne alloy is conventionally applied to the metals by a hot dip process wherein the metal is immersed into a molten bath of terne metal. The terne coating greatly inhibits the formation of ferrous oxide on the metal thus preventing corrosion and extending the life of the metal. The corrosion resistive properties of the terne alloy result from the stability of elemental lead and tin and the lead-tin oxide which forms from atmospheric exposure.

Although terne coated stainless steel or low carbon steel have excellent corrosive resistive properties and have been used in various applications such as roofing, the terne coated roofing materials have recently been questioned due to environmental concerns. The terne coating contains a very high percentage of lead and commonly includes over 80 weight percent of the terne alloy. Although the lead in terne alloys is stabilized, there is concern about leaching of the lead from the terne alloy. As a result, terne coated materials have been limited from use in various applications, such as aquifer roofing systems. The concern of lead possibly leaching from terne coated roofing systems renders normal terne coating inadequate and undesirable as a metal roofing coating for these types of roofing applications.

Roofing systems made of uncoated sheet metal or stainless steel have been used for aquifer roofing systems. However, unprotected sheet metal or stainless steel tend to oxidize after being exposed for a relatively short time to the atmosphere. The oxidation or corrosion of the sheet metal or stainless steel may combine with the runoff water and adversely affect the taste and color of the water. Other metal such as copper can be used as the roofing material; however, copper, although more corrosion resistant than low carbon steel, will eventually combine with oxygen and carbon dioxide in the atmosphere to form a protective green or bluish-green layer. Although the protective layer greatly reduces the further oxidation of the copper, a small amount of the protective layer may cosine with the runoff water and affect the color and taste of the water. Other metals which resist oxidation such as titanium, chromium, gold or nickel are too expensive and/or unsafe to use for roofing materials.

Another disadvantage of terne coated materials is the softness of the terne layer. As noted, terne coated metal sheets are commonly formed into varying shapes. The forming machines used to bend the metal sheets periodically damage the terne coating during the bending process, since the terne coating is susceptible to damage due to the abrasive nature of the forming machines.

Another disadvantage of terne coated low carbon steel or stainless steel is the difficulty of forming the roofing materials into intricate designs. Each roof of a building has a variety of intersecting slopes and configurations. In addition, many roofing systems include simple and/or complex ornamental designs. Because of the different designs of the roofing systems, much of the roofing material is formed on sight. Stainless steel and low carbon steel are strong and rigid materials which cannot be easily formed on sight into complex shapes. As a result, complex and ornamental shapes must be preformed prior to installation of the roof system.

A further disadvantage of using normal terne coated materials is that newly applied terne is highly reflective to light. Use of terne roofing materials on buildings near or within an airport can produce a certain amount of glare to pilots taking-off and landing. Due to the highly stable nature of terne alloys, terne coated metals take about one and one-half to two years before oxidation of the terne begins to dull the terne alloy surface. The present invention deals with these disadvantages of normal terne coated roofing sheet material.

SUMMARY OF THE INVENTION

It is a principal feature of the present invention to provide a highly corrosion resistant roofing system which can be easily formed into complex roofing panels on sight and can be used to collect potable water.

In accordance with the principal feature of the invention, there is provided a roofing material comprised of malleable copper or a copper alloy coated with a metal containing an extremely low weight percentage of lead. The metal coating consists of a large weight percentage of tin and a lead content up to 1.0 percent by weight and preferably less than 0.05 percent by weight, which produces a metal coating that is both corrosion resistant for preventing oxidation of the roofing material and is pliable and abrasive resistant so that it can be formed into various roofing components without cracking or otherwise damaging the metal coating.

In accordance with another aspect of the invention, bismuth and antimony are added to the metal coating which produces a unique combination of bismuth, antimony, lead and tin for forming a protective coating which is highly resistive to corrosion when exposed to the elements of the atmosphere, especially in rural environments. Specifically, bismuth and antimony are added to the metal coating to both strengthen the coating and to inhibit crystallization of the tin. Pure tin is a soft and malleable metal. Because of the physical properties of tin, tin can be worn down and/or deformed if placed in an abrasive environment. Since tin constitutes a large percentage of the metal coating, many of the physical characteristics of elemental tin dominate the properties of the metal coating. Although tin is a stronger and harder substance than lead, thus making the metal coating more abrasive resistant than standard terne alloys, high abrasive environments may damage the metal coating. The addition of bismuth and antimony significantly enhances the hardness and strength of the metal coating to increase resistivity to wear caused by abrasion. The bismuth and antimony further combine with the tin in the metal coating to inhibit crystallization of the tin in cold weather. When tin crystallizes, it may not properly bond to the copper or copper alloy roofing materials. As a result, the metal coating may prematurely flake off and expose the roofing materials to the atmosphere. The addition of bismuth and antimony prevents crystallization of the tin to eliminate possible problems of the metal coating bonding to the roofing materials. The amount of bismuth and antimony is controlled so that the metal coating does not become too rigid so as to prevent easy formation of the coated copper roofing material. Generally less than 1.0 weight percent of bismuth and/or antimony is contained in the metal coating and typically only 0.5 weight percent or less is used in the metal coating.

In accordance with yet another feature of the present invention, a metal coloring agent is added to the metal coating to dull the reflective properties of the newly applied metal coating on the roofing materials while also adding additional strength to the metal to further resist abrasion which may damage the metal coating. Newly applied, the metal coating has a shiny silver surface which is very reflective. In some roofing applications, this highly reflective property is unwanted. By adding metallic copper to the metal coating, the newly coated roofing materials exhibit a duller, less reflective surface. Metallic copper adds a reddish tint to the metal coating, which significantly reduces the light reflective properties of the coating. Copper may also assist in the corrosive resistive properties of the metal coating. When copper oxidizes, the oxide forms a black and/or blue-green protective layer to shield the roofing materials from the atmosphere. The various copper oxides also contribute to dulling the metal coating surface.

In accordance with an additional feature of the present invention, zinc metal is added to further increase the hardness of the tin based alloy while also contributing to the corrosion resistance of the metal coating since oxidation of zinc produces a zinc oxide coating which assists in shielding the roofing materials from the elements of the atmosphere. The amount of zinc used in the metal coating is controlled so that the metal coating does not become so rigid as to prevent easy formation of the metal coated copper roofing materials. Generally less than 1.0 weight percent zinc comprises the metal coating.

In accordance with another feature of the present invention, the metal coating exhibits excellent soldering characteristics such that various electrodes including lead and no-lead electrodes can be used to weld the coated roofing materials together.

The primary object of the present invention is the provision of a roofing material treated with a corrosion resistant substance whereby the roofing material is malleable, thus formable into a variety of shapes, and can be used to collect potable water.

Another object of the present invention is the provision of a roofing material comprising a copper or copper alloy coated with a metal coating containing a low amount of lead and a large amount of tin.

Yet another object of the present invention is the provision of a roofing material treated with a metal coating containing at least 90% tin and up to 1.0% lead by weight composition.

Still yet another object of the present invention is a metal coating, as defined above, containing antimony and/or bismuth to harden the metal coating and to inhibit crystallization of the tin in the metal coating.

Another object of the invention is the provision of a roofing material coated with a metal coating containing zinc and/or iron to enhance the strength and hardness of the metal coating.

Another object of the present invention is the provision of a roofing material treated with a metal coating which includes metallic copper to dull the surface of the metal coating.

Still yet another object of the invention is to provide a metal coating applied to a copper or copper alloy sheet which can be subsequently sheared and formed in a press to make roof pans, cleats, caps and the like, which can be subsequently assembled on site by pressing, etc. into a roof without the metal coating flaking or chipping during pressing, bending or shearing off of the copper or copper alloy sheet.

Still yet another specific object of the invention is to provide a metal coating which can be applied to a copper or copper alloy roofing material and, thereafter, preformed into roof pans which are subsequently seamed at the site either by press seams or soldered seams into waterproof joints.

A still further object is to provide a metal coating which has superior corrosive characteristics permitting a thinner coating of the metal coating to the copper or copper alloy roofing material than that which is required for conventional terne coatings with a high lead content.

Another object of the invention is to provide a metal coating that can be soldered with conventional tin-lead solders or no-lead solders.

Still a further object of the present invention is the provision of a copper or copper alloy roofing system coated with a corrosion resistant metal alloy which can be formed on site into complex shapes and ornamental designs.

These and other objects and advantages will become apparent to those skilled in the art upon a reading of the detailed description of the invention set forth below.

DESCRIPTION OF THE PREFERRED EMBODIMENT

The formable corrosive resistant roofing system consists of a copper or copper alloy sheet coated with a metal alloy containing very little lead. Commercial pure copper is used for the roofing material due to its desirable mechanical properties and natural corrosive resistant properties. Copper is one of the strongest pure metals. It is moderately hard, extremely tough, and wear resistant. Though copper in its commercially pure state is very formable thus relatively easily shaped, the copper can be further softened by an annealing process to further improve its formability. Copper alloys can also be used in the roofing system. Some common alloys of copper are copper-zinc alloys or copper-nickel alloys. Generally, the copper alloys reduce the formability of the roofing material and may not be usable to form on site a complex ornamental roof structure. The thickness of the copper sheets varies depending on the particular roofing application. Generally, copper sheets having thickness comparable to stainless 304 and stainless 316 are used.

Commercial copper naturally resists corrosion in typically atmospheric conditions. When copper roofing sheets are exposed to oxygen and carbon dioxides, the sheet surface reacts to form a black and/or green film. This film acts as a natural protective coating against further reduction of the copper. Uncoated copper can be used to collect water; however, the oxidized copper tends to mix with the water and adversely affects the taste and color of the water.

The life of the copper roofing can be significantly extended by coating the copper with a metal alloy containing large amounts of tin and a small amount of lead. The use of a metal coating on copper roofing materials, to the inventor's knowledge, is new to the roofing industry. Surprisingly, the metal coating readily bonds to the copper.

The metal coating has a very high resistance to corrosion from the atmosphere. The metal coating contains a large weight percentage of tin and a very small weight percentage of lead. The metal coating is highly corrosive resistant, abrasive resistant, pliable, weldable and environmentally friendly. The metal coating can be applied to roofing materials by preferably using conventional hot dipping techniques, but may be applied by other means, i.e. electroplating, air knife process, etc. The metal coating also forms a strong bond with the copper or copper alloy. Treating the surfaces of the copper with an organic coating may further strengthen the bonding between the metal coating and copper roofing material.

The amount of corrosion resistance protection provided by the metal coating is one of the primary concerns for a copper roofing system. Copper or copper alloys slowly oxidize when exposed to the atmosphere. Over a period of time, the oxidized copper will begin to weaken and disintegrate. The coating of the copper roofing materials coated with the metal coating acts as a barrier to the atmosphere, which prevents the copper from reducing in the presence of oxygen or carbon dioxide. Although the metal coating oxidizes when exposed to the atmosphere, the rate of oxidation is significantly slower than oxidation rate of copper. The slower oxidation rate of the metal coating is in part due to the stability of tin. By coating copper roofing materials with the metal coating, the life of the roofing materials is extended beyond the usable life of the structure the roof materials are used on.

The pliability of the metal coated copper roofing materials is also important since the roofing materials are formed into various shapes and may be folded to form seams to bind the roofing materials together to form a roofing system. A roof material coating that forms a rigid or brittle coating on the copper roofing material may crack or may prevent the roofing materials from being properly shaped. Furthermore, a roofing material coating which is brittle or rigid may hinder or even prevent the roofing material from being properly folded to form the necessary seams to attach the roofing materials together. Metals such as zinc are known for their highly rigid nature. A roofing material coated with zinc, commonly known as galvanized steel, cannot be folded without fear of damaging the protective zinc coating. The metal coating of the present invention is pliable enough such that when it is coated on the copper roofing material, the coated roofing material can still be easily formed into a variety of shapes. In addition to the metal coating having to be pliable and corrosion resistant, the metal coating must be solderable since roofing panels are commonly soldered together. The metal coating of the present invention meets all these requirements by containing extremely low levels of lead, which produces a highly corrosive resistant metallic coating with relatively high pliability and can be soldered to other materials.

The metal coating has a tin content of least 90 weight percent of the alloy. It is believed that metal coating of copper roof materials with an alloy containing large amounts of tin and small amounts of lead has not previously been done. Elemental tin is a relatively soft and stable element which exhibits unusually high corrosion resistant properties in a variety of atmospheric conditions. As a result, the metal coating which contains at least 90% tin is highly pliable and highly corrosive resistant. The weight percent of the lead in the metal coating is less than or equal to about 1.0%.

The low lead metal coating also exhibited high resistance to leaching of any lead which may be contained in the metal coating, thus expanding the uses of roofing materials treated with the metal coating. A particularly desirable use for copper material coated with the metal alloy is for the collection of potable water. Since the metal coating is highly corrosive resistant, a roofing system made of the copper roofing material has a very long life expectancy. In addition, the concern for potential lead ions accumulating in the potable water is eliminated due to the highly stable, non leaching tin-lead alloy. Finally, the adverse effects of copper oxides to the potable water (i.e. discoloration of water, metallic taste) are eliminated by coating the copper with the metal alloy, thereby making such a roofing system desirable for the collection of water.

The metal coating contains a very large weight percentage of tin. Preferably the tin content is greater than 90% and can be as much as 99.9%. The lead content of the low lead metal coating can range between 0.001 to 1.0 weight percent. Preferably, the lead content is less than 0.05 weight percent and about 0.01 percent. Tin is the primary bonding agent for the metal coating. Lead does not bond as well with copper materials. The high concentrations of tin in the metal coating of the present invention substantially increase the uniformity and strength of the bond between the metal coating and the roofing materials. The superior bonding characteristics of the metal coating makes the coating ideal for use with materials that are formed and shaped after being coated.

The metal coating may also contain bismuth and antimony. The bismuth contained in the metal coating typically ranges between 0.0 to 1.7 weight percent of the alloy and preferably is about 0.5 weight percent. Antimony may also be added to the metal coating in amounts ranging between 0.0 to 7.5 weight percent. The tin based alloy preferably contains bismuth and/or antimony since these two elements add to abrasive resistive properties of the metal coating and prevent the tin in the metal coating from crystallizing, which may result in flaking of the metal coating from the copper roofing material. Tin begins to crystallize when the temperature begins to drop below 56° F. (13.2° C.). Only small amounts of antimony or bismuth are needed to prevent the tin from crystallizing. Typically, amounts of less than 0.5 weight percent are required to adequately inhibit crystallization of the tin, which may result in the metal coating prematurely flaking. Antimony and/or bismuth in weight percentage amounts greater than 0.5% are used to harden the metal coating. The amount of antimony and/or bismuth in the metal coating is monitored so as to provide enough to prevent tin crystallization, yet, not too much to make the metal coating so rigid that it is not malleable. Preferably the weight percentage of bismuth and/or antimony is less than 1.0% percent and typically about 0.5%.

Industrial grade tin can be used as the tin source for the metal coating. Industrial grade tin is known to contain trace amounts of contaminants such as cobalt, nickel, silver and sulphur. It has been found that these elements do not adversely affect the corrosive resistive properties of the metal coating so long as the weight percentages of each of these elements is very small.

Copper may be added to the metal coating to strengthen the metal coating and to reduce the reflectivity of the metal coating. The amount of copper metal in the metal coating may range between 0.0 to 2.7 weight percent. The desired color of the metal coating will determine the amount of copper used.

Zinc metal may also be added to the metal coating to further increase the abrasion resistance of the metal coating. Zinc metal may be added to the metal coating in weight percentage amounts between 0.0 to 1.5. The amounts of zinc metal added will depend on the desired hardness of the metal coating. Small amounts of iron may also be added to the metal coating in weight percentage amounts between 0.0 to 0.1 to further increase the hardness and strength of the metal coating.

Aluminum and cadmium have been found to adversely affect the corrosive resistive properties of the metal coating. Preferably, the weight percentages of aluminum and cadmium should be less than 0.05% cadmium and less than 0.001% aluminum.

Examples of the metal coating system, which have exhibited the desired characteristics as mentioned above, are set forth as follows:

| Alloy Ingredients | A | B | C | D | E | F | G |
| --- | --- | --- | --- | --- | --- | --- | --- |
| Antimony | 0.5 | 0.75 | 7.5 | 2.5 | 0.75 | 1.0 | — |
| Bismuth | 1.7 | 0.5 | — | — | 0.5 | 0.5 | 0.5 |
| Copper | — | — | 2.7 | 2.0 | — | — | — |
| Zinc | 0.001 | 0.5 | — | 0.5 | 0.5 | — | — |
| Lead | ≦1.0 | ≦1.0 | ≦1.0 | ≦1.0 | ≦1.0 | ≦1.0 | ≦1.0 |
| Iron | — | 0.1 | — | — | 0.1 | 0.1 | 0.1 |
| Tin | Bal. | Bal. | Bal. | Bal. | Bal. | Bal. | Bal. |

Generally, formulations of the metal coating include in weight percent amounts: 0.001–1.0% lead, 0.0–2.5% antimony, 0.0–0.5% bismuth, 0.0–2.7% copper, 0.0–0.1% iron, 0.0–1.5% zinc and the remainder tin.

The thickness of the metal coating may be varied depending on the environment in which the treated roofing system is used. The metal coating exhibits superior corrosive resistant properties in rural environments, thus requiring a thinner coating. The metal coating also resists corrosion in industrial and marine environments, but may require a slightly thicker coating. The metal coating thicknesses typically can range between 0.0003 inches to 0.2 inches. While copper roofing materials can be coated with the metal coating of the present invention at such thicknesses, the thickness of the metal coating is based on the anticipated life of the building the roofing materials are applied to and the environment in which the roofing materials are used. Roofing materials coated with a metal coating of 0.001 inches to 0,002 inches are preferably used in all types of environments, thus reducing the price of the roofing materials. The thinner coatings may be applied by an air knife process or electroplating process instead of the conventional hot dip process.

The metal coating is designed to be used in all types of roofing applications. The metal coated copper roofing materials can be used for standing seam and press fit (mechanical joining, see assignee's U.S. Pat. No. 4,987,716) applications. In standing seam applications, the edges of the roofing materials are folded together and then soldered to form a water tight seal. The metal coating inherently includes excellent soldering characteristics. When the metal coating is heated, it has the necessary wetting properties to produce a tight, water resistant seal. As a result, the metal coating acts as both a corrosive resistive coating and a soldering agent for standing seam roofing systems. The metal coated materials can also be welded with standard solders. Typical solders contain about 50% tin and 50% lead. The metal coating has the added advantage of also being able to be soldered with low or no-lead solders. The metal coated copper roofing materials can also be used in mechanically joined roofing systems due to the malleability of the coating. Mechanically joined systems form water tight seals by folding adjacent roof material edges together and subsequently applying a compressive force to the seam in excess of 1,000 psi. Under these high pressures, the metal coating plastically deforms within the seam and produces a water tight seal.

The invention has been described with reference to preferred and alternate embodiments. Modifications and alterations will become apparent to those skilled in the art upon reading and understanding the detailed discussion of the invention provided for herein. This invention is intended to include all such modifications and alterations insofar as they come within the scope of the present invention.

Having thus defined the invention, the following is claimed:

1. A highly corrosive resistant roof system which can be easily formed into complex shapes used for the collection of potable water, comprising a copper roofing material coated with a highly corrosive resistant metal alloy material, said metal alloy material having a low lead formulation and includes at least 0.05 weight percent metallic stabilizing agent, said metal alloy material consisting of:

| Tin | 90.0 – 99.95 |
|---|---|
| Lead | 0.001 – 0.1 |
| Bismuth | 0.0 – 1.7 |
| Antimony | 0.0 – 7.2 |
| Zinc | 0.0 – 0.5 |
| Iron | 0.0 – 0.1 |
| Copper | 0.0 – 2.7 |

2. A coated copper roofing material as in claim 1, wherein said metallic stabilizer is selected from the group consisting of bismuth and antimony.

3. A coated copper roofing material as in claim 1, wherein said lead is not more than 0.01 weight percent.

4. A highly corrosive resistant roof system which can be easily formed into complex shapes used for the collection of potable water comprising of a copper roofing material coated with a highly corrosive resistant metal alloy material, said metal alloy having a low lead formulation and includes at least 0.05 weight percent metallic stabilizer, said metallic alloy comprises of the following weight percentages:

| Tin | 90.0 – 99.95 |
|---|---|
| Lead | 0.001 – 0.1 |
| Bismuth | 0.0 – 1.7 |
| Antimony | 0.0 – 7.2 |
| Zinc | 0.0 – 0.5 |
| Iron | 0.0 – 0.1 |
| Copper | 0.0 – 2.7. |

5. A coated copper roofing material as in claim 4, wherein said metal coating consisting essentially of the following weight percentages:

| Bismuth | $\leq$1.7% |
|---|---|
| Antimony | $\leq$0.5% |
| Zinc | $\leq$0.001% |
| Lead | $\leq$0.02% |
| Tin | Balance. |

6. A coated copper roofing material as in claim 4, wherein said metal coating consisting essentially of the following weight percentages:

| Bismuth | $\leq$0.5% |
|---|---|
| Antimony | $\leq$0.75% |
| Zinc | $\leq$0.5% |
| Lead | $\leq$0.05% |
| Iron | $\leq$0.01% |
| Tin | Balance. |

7. A coated copper roofing material as in claim 4, wherein said metal coating consisting essentially of the following weight percentages:

| Antimony | $\leq$7.2% |
|---|---|
| Copper | $\leq$2.7% |
| Tin | Balance. |

8. A coated copper roofing material as in claim 4, wherein said metal coating consisting essentially of the following weight percentages:

| Antimony | $\leq$2.5% |
|---|---|
| Copper | $\leq$2.0% |
| Zinc | $\leq$0.5% |
| Tin | Balance. |

9. A coated copper roofing material as in claim 4, wherein said metal coating consisting essentially of the following weight percentages:

| Bismuth | $\leq$0.5% |
|---|---|
| Antimony | $\leq$0.75% |
| Zinc | $\leq$0.5% |
| Tin | Balance. |

10. A coated copper roofing material as in claim 4, wherein said metal coating consisting essentially of the following weight percentages:

| Bismuth | $\leq$0.5% |
|---|---|
| Antimony | $\leq$1.0% |
| Iron | $\leq$0.1% |
| Tin | Balance. |

11. A coated copper roofing material as in claim 4, wherein said metal coating consisting essentially of the following weight percentages:

| Bismuth | $\leq$0.5% |
|---|---|
| Iron | $\leq$0.1% |
| Tin | Balance. |

12. In a metal roof forming system comprising preformed pans of copper sheet metal abutted together and bent over one another at their edges to form waterproof seams, said improvement comprising: a copper sheet coated on both sides with a corrosive resistant metal coating prior to forming said water-proof seams, said metal coating comprising more than 90 weight percent tin, 0.001–0.1 weight percent lead and at least 0.05 weight percentage stabilizing agent.

13. A roof forming system as defined in claim 12, wherein said metallic coating (weight percent) comprises:

| Tin | 90.0 – 99.95% |
|---|---|
| Lead | 0.001 – 0.05% |
| Bismuth | 0.0 – 1.7% |
| Antimony | 0.0 – 7.5% |

14. A roof forming system as defined in claim 13, wherein said metallic coating contains 95.0–99.95 weight percent tin.

* * * * *

UNITED STATES PATENT AND TRADEMARK OFFICE
CERTIFICATE OF CORRECTION

PATENT NO. : 5,354,624
DATED : October 11, 1994
INVENTOR(S) : Jay F. Carey, II It is certified that error appears in the above-identified patent and that said Letters Patent is hereby corrected as shown below:

Title page, item [*]:

"Notice:" delete Nov. 17, 2010 and substitute therefor May 24, 2011

Signed and Sealed this

Twenty-eight Day of March, 1995

*Attest:*

BRUCE LEHMAN

*Attesting Officer*  *Commissioner of Patents and Trademarks*

UNITED STATES PATENT AND TRADEMARK OFFICE
CERTIFICATE OF CORRECTION

PATENT NO.      : 5,354,624
DATED           : October 11, 1994
INVENTOR(S)     : Carey, II It is certified that error appears in the above-identified patent and that said Letters Patent is hereby corrected as shown below:

Title page,
Item [63], delete the information and substitute therefor -- Continuation-in-part of Ser. No. 07/967,407, Oct. 26, 1992, abandoned, which is a continuation-in-part of Ser. No. 07/913,209, Jul. 15, 1992, abandoned, which is a continuation-in-part of Ser. No. 07/858,662, Mar. 27, 1992, Pat. No. 5,314,758. --

Column 1,
Line 9, delete and substitute therefor the following: -- Roofing Material," which in turn is a continuation-in-part of Ser. No. 07/858,662 filed March 27, 1992, now Patent No. 5,314,758. --

Signed and Sealed this

Thirtieth Day of July, 2002

Attest:

Attesting Officer

JAMES E. ROGAN
Director of the United States Patent and Trademark Office